June 26, 1923.

M. A. JONES ET AL

FUEL OIL SEPARATOR AND VAPORIZER

Filed June 26, 1922

1,460,063

2 Sheets—Sheet 1

Inventors
M. A. Jones
R. Krollage
E. C. Yeager.

By Jack A. Ashly
Attorney

June 26, 1923.
M. A. JONES ET AL
1,460,063
FUEL OIL SEPARATOR AND VAPORIZER
Filed June 26, 1922
2 Sheets-Sheet 2
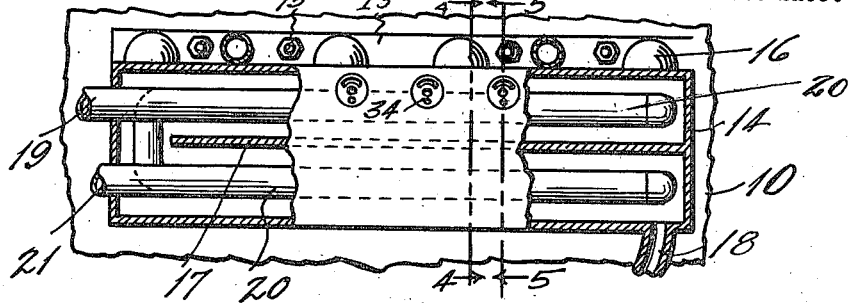
Fig. 3.
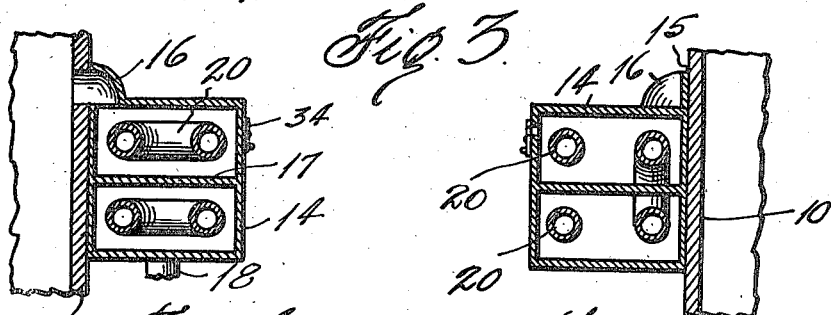
Fig. 4.   Fig. 5.
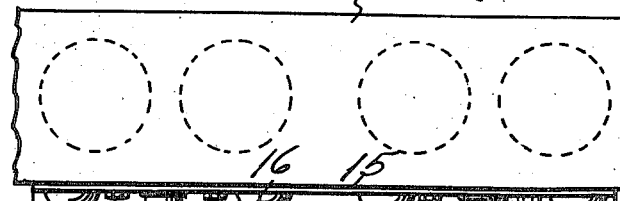
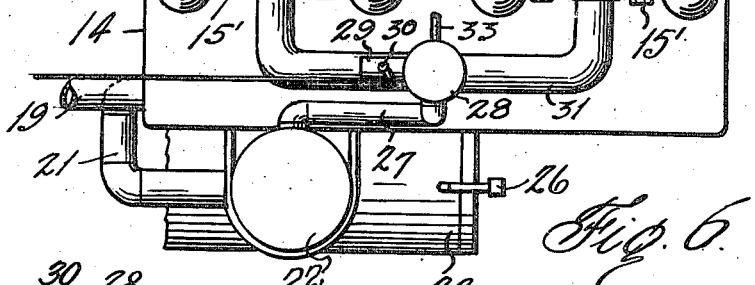
Fig. 6.
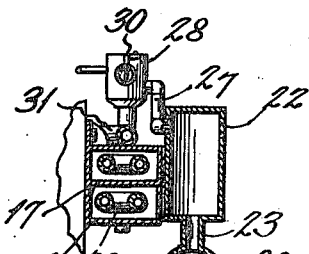
Fig. 7.
Inventors
M. A. Jones
R. Krollage
E. C. Yeager.
By Jack O. Ashby
Attorney Patented June 26, 1923.

1,460,063

UNITED STATES PATENT OFFICE.

MARTIN A. JONES, RUDOLPH KROLLAGE, AND EARNEST C. YEAGER, OF McGREGOR, TEXAS.

FUEL-OIL SEPARATOR AND VAPORIZER.

Application filed June 26, 1922. Serial No. 570,853.

*To all whom it may concern:*

Be it known that we, MARTIN A. JONES, RUDOLPH KROLLAGE, and EARNEST C. YEAGER, citizens of the United States, residing at McGregor, in the county of McLennan and State of Texas, have invented certain new and useful Improvements in Fuel-Oil Separators and Vaporizers, of which the following is a specification.

This invention relates to new and useful improvements in fuel oil separators and vaporizers.

The object of the invention is to provide means for heating crude oil and the like and then separating the gaseous vapors from the body of the oil and utilizing said vapors as fuel in an internal combustion engine.

A further object is to rarify the oil prior to its heating in order to promote vaporization. Another object is to collect the heavy or base oil products adjacent the point of separation, whereby a commercial product is recovered.

A still further object is to utilize the hot exhaust gases in a unique manner in heating the crude oil as well as the intake manifold into which latter the separated gaseous vapors are admitted after having been admixed with air.

An important advantage of the invention is simplicity of application and operation, together with a cheap fuel as well as one which is highly efficient. A very important feature is the separation of the heavy non-combustible products from the gaseous vapors, and the admixing of said vapors with sufficient air to produce a highly combustible mixture, all prior to the entrance of said vapors into the intake manifold, together with the superheating of said vapors in said manifold.

A construction designed to carry out the invention will be hereinafter described together with other features of the invention.

Figure 1:
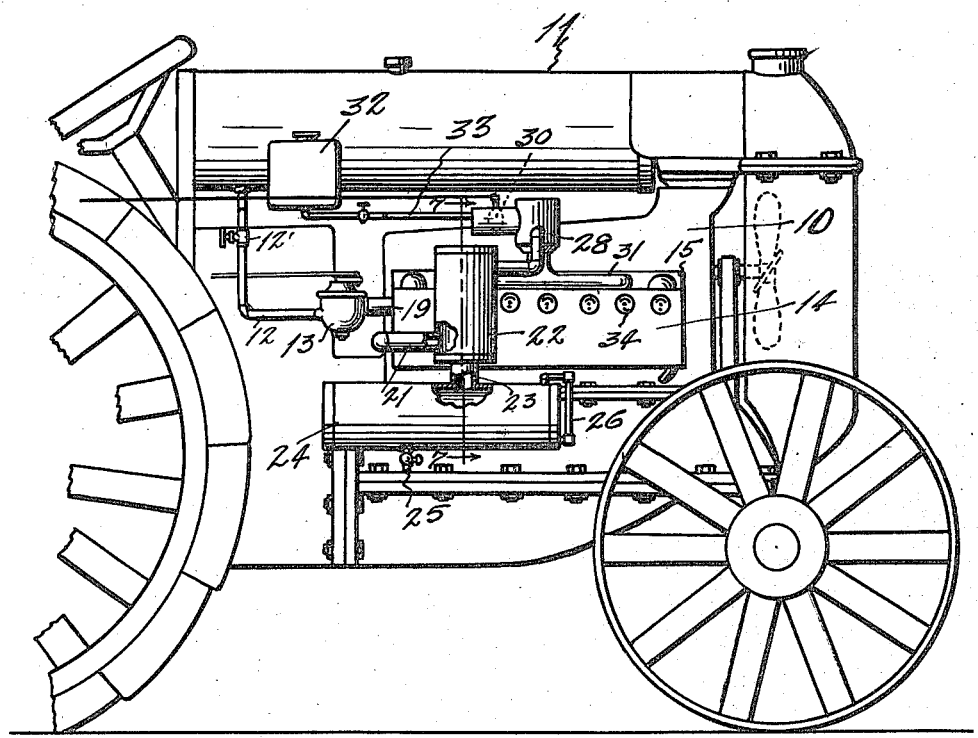
Figure 2:
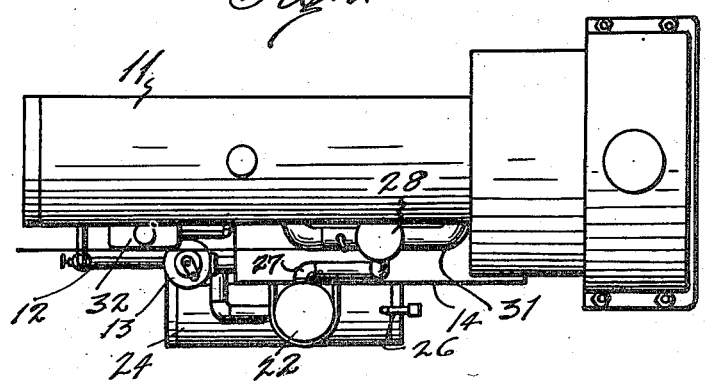

The invention will be more readily understood from a reading of the following specification and by reference to the accompanying drawings, in which an example of the invention is shown, and wherein:

Fig. 1 is a side elevation of a tractor equipped with an apparatus constructed in accordance with our invention, Fig. 2 is a plan view of the same, Fig. 3 is an enlarged front view of the exhaust heater box, Fig. 4 is a transverse sectional view on the line 4—4 of Fig. 3, Fig. 5 is a transverse sectional view on the line 5—5 of Fig. 3, Fig. 6 is an enlarged plan view of the apparatus, and Fig. 7 is a vertical sectional view of the separating elements.

In the drawings the numeral 10 designates the motor of a tractor and 11 the fuel oil tank thereof. It is to be understood that this invention may be used in connection with any style of internal combustion engine whether stationary or mobile, and a tractor is merely used as a means of illustration.

From the tank 11 a feed pipe 12 including a cut-off valve 12' depends and is bent at right angles and directed forwardly to a carburetor or fuel bowl 13, which is provided with a suitable air admitting opening. The function of the carburetor is to control the supply of fuel oil and to permit the admixture of air therewith for the purpose of rarification.

An exhaust heater box 14 has an upstanding flange 15 along the top of its rear wall. This box is substantially square in cross-section and rectangular in length. By means of the flange the box may be secured to the side of the motor block by bolts 15'. Integral elbows 16 extend from the flange to the top of the box and are located to register with the exhaust ports of the engine 10. The hot exhaust gases are thus directed down into the box. A horizontal partition 17 extends longitudinally of the box at the center thereof, but terminates short of the rear end of said box. The box has an exhaust opening 18 in its bottom at the forward end thereof. The exhaust gases entering the top of the box must pass rearwardly over the partition and then forwardly under the same in order to escape. These gases while in the box will expand and dissipate to a large extent their excessive heat, whereby said box and its contents will be highly heated.

From the carburetor 13 a pipe 19 leads into the rear end of the box and is connected with a coil 20 therein. This coil has a leg above the partition and a leg below the same as is shown in Figs. 3, 4, and 5. This causes the fuel oil to traverse the coil above and below the partition, during which it is heated to such a high degree as to cause the lighter or more volatile products to vaporize. A short V-shaped horizontal discharge pipe 21 leads from the lower rear end of the coil, through the rear end of the box and into the lower side portion of a vertical separating drum 22 mounted in the side of the box at the rear end thereof.

A short collar 23 connects the bottom of the drum with a horizontal receptacle 24. This receptacle is provided with a drain cock 25 in its bottom and a level gauge 26 on its front end, whereby the level of the oil may be observed and the oil drawn off through the cock when necessary. The hot fluid enters the drum near its bottom and the vapors or light gaseous products rise therein, while the liquid and non-volatile products pass down through the collar into the receptacle.

This separation is vastly important as it permits only the highly combustible products to pass on to the motor, while it recovers the base oil and non-volatile products in a commercial state, such products being saleable at substantially their purchase price.

The gaseous vapors passing up through the drum escape through an elbow 27 into an air mixer 28 which is provided with an air admitting tube 29 having a controlling valve 30 therein. The gaseous vapors entering the mixer are aerated and made more highly combustible by the gasification which has its inception therein. An intake manifold 31 is connected at its center with the bottom of the mixer and rests on top of the heater box 14, whereby it is heated. The gaseous vapors upon entering this hot manifold will be further gasified and a very highly combustible fuel produced. This fuel is taken into the motor in the usual manner, the manifold being connected with the motor through the flange 15.

In operating an engine with this apparatus, gasoline or other fuel oil for starting purposes is supplied from a small tank 32 through a pipe 33 to the air mixer and the engine started in the usual manner. Just as soon as the exhaust gases heat the coils 20 in the box 14, the valve 12' may be opened and the starting oil cut off. The suction created by the engine will draw the fuel oil from the carburetor 13 through the coils 20 and into the separating drum. The heated products are separated in the drum, the lighter vapors pass up through the same. Unless protected, condensation of the vapors will take place in the drum, mixer 28, and elbow 27; however, such condensates will drain back through the rising vapors to the receptacle 24, during which they will be to some extent deprived of some of their gaseous products.

The gaseous vapors are mixed with air in the mixer 28 and this mixture is heated in the intake manifold 31, whereby a highly combustible gaseous fuel is taken into the engine. In case the heater box 14 should become too hot, dampers 34 on the outer side thereof may be opened.

Various changes in the size and location of the parts as well as modifications and alterations may be made within the scope of the appended claims and without departing from the spirit of the invention.

What we claim, is:

1. In a crude fuel oil separating and vaporizing apparatus for internal combustion engines, a crude oil supply tank, a heating element through which the oil is conducted and which is exposed to the hot exhaust gases of an engine, a separating chamber in which the fuel oil from the heating element is received and whereby the vapors are expanded and separated from the liquids, a receptacle connected with the chamber for collecting and segregating the liquids, and heated means for conducting the separated vapors to the engine.

2. In a crude fuel oil separating and vaporizing apparatus for internal combustion engines, a crude oil supply tank, a heating element through which the oil is conducted and which is exposed to the hot exhaust gases of an engine, a separating chamber in which the fuel oil from the heating element is received and whereby the vapors are expanded and separated from the liquids, a receptacle connected with the chamber for collecting and segregating the separated liquids, an air mixer connected with the separating chamber and receiving the gaseous products therefrom, and a heated manifold connected with the mixer and the engine for conveying the fuel vapors thereto.

3. In a crude oil separating and vaporizing system for internal combustion engines, the combination of means exposed to the exhaust gases of an engine for heating a crude oil in transit, means connected with the heating means for separating the gaseous vapors from the crude oil liquids, a collecting receptacle connected with the separating means for collecting and segregating the liquids, an intake manifold exposed to the heat dissipated by the engine, and an air mixer interposed between the separating means and the manifold and through which mixer the gaseous vapors pass from the separating means to the intake manifold.

4. In a crude fuel oil separating and vaporizing system for internal combustion engines, the combination of a crude oil supply, a control for the supply also admitting air, means connected with the crude oil supply and exposed to the exhaust gases of an engine for heating the crude oil, means connected with the heating means for separating the gaseous vapors from the liquids, a liquid collecting receptacle connected with the separating means, an intake manifold exposed to the heat dissipated by the engine, and an air mixer interposed between the separating means and the manifold and through which mixer the gaseous vapors pass from the separating means to the intake manifold.

5. In a crude fuel oil separating and vaporizing apparatus for internal combustion engines, a crude oil supply tank, an independent heating coil exposed to the exhaust gases of an engine, a separating and expanding drum connected with the coil, a collecting receptacle for the separated liquids under the drum, and an intake manifold connected with the drum.

6. In a crude fuel oil separating and vaporizing apparatus for internal combustion engines, a crude oil supply tank, a heating coil exposed to the exhaust gases of an engine, a separating and expanding drum connected with the coil, a collecting receptacle for the separated liquids under the drum, and an air mixer interposed between the drum and the manifold.

7. In a crude fuel oil separating and vaporizing apparatus for internal combustion engines, a crude oil supply tank, a heating coil exposed to the exhaust gases of an engine, a separating and expanding drum connected with the coil, a collecting receptacle for the separated liquids under the drum, an intake manifold connected with the drum, an air mixer interposed between the drum and the manifold, and a heating box enclosing the coil and having an exhaust outlet.

8. In a crude fuel oil separating and vaporizing apparatus for internal combustion engines, a crude oil supply tank, a heating coil exposed to the exhaust gases of an engine, an oil supply controlling device having an air opening interposed between the tank and the heating coil, a separating drum connected with the coil, a collecting receptacle for the separated liquids under the drum, an intake manifold connected with the drum, and an air mixer interposed between the drum and the manifold.

9. In a crude fuel oil separating and vaporizing apparatus for internal combustion engines, a crude oil supply tank, a feed pipe leading from the tank, controlling and air admitting means interposed in said pipe, a heater box having a partition, a coil in said box above and below said partition and connected with the supply pipe, said box having exhaust gas inlets, a vertical separating drum connected with said coil, a liquid collecting receptacle under said drum, and means for conveying gaseous vapors from the top of the drum to an engine.

10. In a crude fuel oil separating and vaporizing apparatus for internal combustion engines, a crude oil supply tank, a feed pipe leading from the tank, controlling and air admitting means interposed in said pipe, a heater box having a partition, a coil in said box above and below said partition and connected with the feed pipe, said box having exhaust gas inlets, a vertical separating drum connected with said coil, an air mixer connected with the drum and receiving gaseous vapors therefrom, and an intake manifold on top of said box and connected with said mixer.

11. As a sub-combination, an exhaust heater comprising an elongated box having a horizontal central partition dividing the box into upper and lower chambers having communication at one end of the partition, the box having exhaust gas inlets in its upper chamber and an outlet in its lower chamber, and a fuel coil extending through the chambers above and below the partition.

In testimony whereof we affix our signatures.

MARTIN A. JONES.
RUDOLPH KROLLAGE.
EARNEST C. YEAGER.